United States Patent
Soga et al.

(10) Patent No.: US 10,800,952 B2
(45) Date of Patent: Oct. 13, 2020

(54) CURABLE RESIN COMPOSITION, FUEL CELL, AND SEALING METHOD

(71) Applicant: THREEBOND CO., LTD., Hachioji-shi, Tokyo (JP)

(72) Inventors: Tetsunori Soga, Hachioji (JP); Hiroshi Takebe, Hachioji (JP)

(73) Assignee: THREEBOND CO., LTD., Hachioji-Shi, Tokyo (JP)

(*) Notice: Subject to any disclaimer, the term of this patent is extended or adjusted under 35 U.S.C. 154(b) by 179 days.

(21) Appl. No.: 16/079,857

(22) PCT Filed: Mar. 3, 2017

(86) PCT No.: PCT/JP2017/008516
§ 371 (c)(1),
(2) Date: Aug. 24, 2018

(87) PCT Pub. No.: WO2017/154777
PCT Pub. Date: Sep. 14, 2017

(65) Prior Publication Data
US 2020/0172770 A1    Jun. 4, 2020

(30) Foreign Application Priority Data
Mar. 9, 2016 (JP) .................... 2016-045192

(51) Int. Cl.
*C09J 123/22* (2006.01)
*C09J 5/06* (2006.01)
(Continued)

(52) U.S. Cl.
CPC ............... *C09J 123/22* (2013.01); *C09J 5/06* (2013.01); *H01M 8/0273* (2013.01);
(Continued)

(58) Field of Classification Search
CPC .. C09J 123/22; H01M 8/0273; H01M 8/0282; H01M 8/1004
See application file for complete search history.

(56) References Cited

U.S. PATENT DOCUMENTS

| | | |
|---|---|---|
| 6,451,468 B1 | 9/2002 | Adachi |
| 2003/0045615 A1 | 3/2003 | Nakamura et al. |

(Continued)

FOREIGN PATENT DOCUMENTS

| | | |
|---|---|---|
| JP | H03-294320 A | 12/1991 |
| JP | 2000-328042 A | 11/2000 |

(Continued)

OTHER PUBLICATIONS

Machine Translation of JP2001-325972A (Apr. 15, 2020) (Year: 2020).*

(Continued)

*Primary Examiner* — Matthew J Merkling
(74) *Attorney, Agent, or Firm* — Manabu Kanesaka

(57) ABSTRACT

The present invention has an object to produce a curable resin composition that achieves both low-temperature curability and low compression set. Provided is a sealing agent for fuel cell, comprising (A) to (D) ingredients: (A) ingredient: a vinyl polymer having one or more alkenyl groups per molecule and being liquid at 25° C.; (B) ingredient: a compound having one or more hydrosilyl groups per molecule; (C) ingredient: a hydrosilylation catalyst; and (D) ingredient: a heavy metal deactivator being one or more compounds selected from the group consisting of amino group-containing triazine compounds, aminotriazole compounds, and hydrazide compounds.

18 Claims, 1 Drawing Sheet

(51) Int. Cl.

| | | |
|---|---|---|
| *H01M 8/0273* | (2016.01) | |
| *H01M 8/0282* | (2016.01) | |
| *H01M 8/0284* | (2016.01) | |
| *H01M 8/1004* | (2016.01) | |
| *C08K 5/3472* | (2006.01) | |
| *C08K 5/3492* | (2006.01) | |
| *C08K 5/5425* | (2006.01) | |
| *H01M 8/1018* | (2016.01) | |

(52) U.S. Cl.
CPC ....... *H01M 8/0282* (2013.01); *H01M 8/0284* (2013.01); *H01M 8/1004* (2013.01); *C08K 5/3472* (2013.01); *C08K 5/3492* (2013.01); *C08K 5/5425* (2013.01); *C09J 2423/00* (2013.01); *H01M 2008/1095* (2013.01)

(56) References Cited

U.S. PATENT DOCUMENTS

| | | |
|---|---|---|
| 2005/0043480 A1 | 2/2005 | Osawa |
| 2005/0123704 A1* | 6/2005 | Sakai .................. C09D 183/04 428/40.1 |
| 2005/0171288 A1 | 8/2005 | Fujimoto et al. |
| 2006/0052546 A1 | 3/2006 | Morikawa et al. |
| 2006/0078781 A1 | 4/2006 | Stegink et al. |
| 2006/0155074 A1 | 7/2006 | Kudo et al. |
| 2007/0221448 A1 | 9/2007 | Kudo et al. |
| 2007/0221815 A1 | 9/2007 | Fujimoto et al. |
| 2007/0225448 A1 | 9/2007 | Kudo et al. |
| 2008/0251202 A1* | 10/2008 | Eagle .................. C09J 163/00 156/330 |
| 2008/0289755 A1 | 11/2008 | Burdzy et al. |
| 2009/0000732 A1 | 1/2009 | Jacobine et al. |
| 2009/0004541 A1 | 1/2009 | Jacobine et al. |
| 2009/0004551 A1 | 1/2009 | Burdzy et al. |
| 2009/0014965 A1 | 1/2009 | Kudo et al. |
| 2009/0162715 A1 | 6/2009 | Burdzy |
| 2009/0176953 A1 | 7/2009 | Morikawa et al. |
| 2009/0263669 A1 | 10/2009 | Burdzy et al. |
| 2010/0144933 A1 | 6/2010 | Irie |
| 2010/0216920 A1 | 8/2010 | Kato et al. |
| 2011/0237702 A1* | 9/2011 | Ide .......................... C08L 63/00 522/99 |
| 2012/0142791 A1* | 6/2012 | Obara .................... C08J 5/2262 521/27 |
| 2015/0115311 A1* | 4/2015 | Yoshida .................. C08L 83/00 257/100 |
| 2015/0246349 A1* | 9/2015 | Sutoh ...................... B01J 31/06 525/478 |
| 2017/0369629 A1* | 12/2017 | Mashima ............... C08G 18/10 |

FOREIGN PATENT DOCUMENTS

| | | |
|---|---|---|
| JP | 2001-325972 A | 11/2000 |
| JP | 2001-214016 A | 8/2001 |
| JP | 2002-332410 A | 11/2002 |
| JP | 2003-007313 A | 1/2003 |
| JP | 2004-075824 A | 3/2004 |
| JP | 2004-111146 A | 4/2004 |
| JP | 2007-100099 A | 4/2007 |
| JP | 2009-026752 A | 2/2009 |
| JP | 2009-524193 A | 6/2009 |
| JP | 2011-124258 A | 6/2011 |
| WO | 99/53559 A1 | 10/1999 |
| WO | 2004/031315 A1 | 4/2004 |

OTHER PUBLICATIONS

PCT/ISA/210, "International Search Report for International Application No. PCT/JP2017/008516," dated May 23, 2017.

Europe Patent Office, "Search Report for European Patent Application No. 17763117.3," dated Jul. 18, 2019.

* cited by examiner

CURABLE RESIN COMPOSITION, FUEL CELL, AND SEALING METHOD

RELATED APPLICATIONS

The present application is National Phase of International Application No. PCT/JP2017/008516 filed Mar. 3, 2017, and claims priority from Japanese Application No. 2016-045192, filed Mar. 9, 2016, the disclosure of which is hereby incorporated by reference herein in its entirety.

TECHNICAL FIELD

The present invention relates to a curable resin composition that achieves both low-temperature curability and low compression set and further has excellent storage stability.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and produces only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operation temperature is relatively low temperature (around 80° C.), and therefore is expected for usages such as motive power sources for automobiles, power generators for households, small power sources for electronic equipment such as mobile phones, and power sources for emergency.

As illustrated in FIG. 1, a cell 1 of a solid polymer fuel cell has a structure including: an electrolyte membrane electrode assembly 5 (MEA) structured such that a polymer electrolyte membrane 4 is nipped between an air electrode 3a and a fuel electrode 3b; a frame 6 that supports the MEA; and separators 2 by which gas flow paths are formed.

In order to activate the solid polymer fuel cell, it is necessary to supply a fuel gas containing hydrogen to an anode electrode and supply an oxidation gas containing oxygen to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on.

Since sealing agents for use in solid polymer fuel cells are required to be a rubber elastic body excellent in gas permeability, low moisture permeability, heat resistance, acid resistance, and flexibility, studies have been made on: a thermosetting resin composition which uses a polyisobutylene polymer and causes a hydrosilylation reaction (see Patent Literature 1); a thermosetting resin composition which uses a fluoropolyether compound and causes a hydrosilylation reaction (see Patent Literature 2); a thermosetting resin composition which uses a fluoropolymer and causes a hydrosilylation reaction (see Patent Literature 3); and a thermosetting resin composition which uses an ethylene-propylene-diene rubber (see Patent Literature 4).

CITATION LIST

Patent Literatures

Patent Literature 1: Japanese Patent Application Publication No. 2004-111146
Patent Literature 2: Japanese Patent Application Publication No. 2004-075824
Patent Literature 3: Japanese Patent Application Publication No. 2007-100099
Patent Literature 4: Japanese Patent Application Publication No. 2011-124258

SUMMARY OF INVENTION

However, since the thermosetting resin compositions of Patent Literatures 1 to 4 make use of the mechanism of curing by heating, cured products thereof inevitably have poor compression set. A possible solution to avoid this is to raise the temperature for hearing and curing to 180° C. or higher and to heat the composition for a long time. However, since the temperature in the curing conditions is too high, there is a problem that the above solution is difficult to apply to plastic and the like which tend to easily deteriorate by heat.

The present invention has been made in view of the foregoing circumstances, and has an object to provide a curable resin composition that achieves both low-temperature curability and low compression set.

The present invention relates to a curable resin composition comprising (A) to (D) ingredients:
(A) ingredient: a vinyl polymer having one or more alkenyl groups per molecule and being liquid at 25° C.;
(B) ingredient: a compound having one or more hydrosilyl groups per molecule;
(C) ingredient: a hydrosilylation catalyst; and
(D) ingredient: a heavy metal deactivator.

Other modes of the present invention may be as follows.

[1]
A curable resin composition the following comprising (A) to (D) ingredients:
(A) ingredient: a vinyl polymer having one or more alkenyl groups per molecule and being liquid at 25° C.;
(B) ingredient: a compound having one or more hydrosilyl groups per molecule;
(C) ingredient: a hydrosilylation catalyst; and
(D) ingredient: a heavy metal deactivator.

[2]
The curable resin composition according to the [1], wherein the (D) ingredient is one or more compounds selected from the group consisting of amino group-containing triazine compounds, aminotriazole compounds, and hydrazide compounds.

[3]
The curable resin composition according to the [1] or [2], wherein the vinyl polymer of the (A) ingredient is polyisobutylene having one or more alkenyl groups.

[4]
The curable resin composition according to any one of the [1] to [3], which is used as a sealing agent for any member in the group consisting of a separator, a frame, an electrolyte, a fuel electrode, an air electrode, and an MEA which are members constituting a fuel cell.

[5]

The curable resin composition according to any one of the [1] to [3], which is used as a sealing agent between adjacent separators in a fuel cell, or a sealing agent between a frame and an electrolyte membrane or an MEA in the fuel cell.

[6]

The curable resin composition according to the [4] or [5], wherein the fuel cell is a solid polymer fuel cell.

[7]

A sealing agent for fuel cell, which uses the curable resin composition according to any one of the [1] to [6].

[8]

A fuel cell comprising any seal in the group consisting of a seal between adjacent separators in the fuel cell and a seal between a frame and an electrolyte membrane or an MEA in the fuel cell, wherein the any seal comprises the curable resin composition according to any one of the [1] to [6].

[9]

The fuel cell according to the [8], wherein the fuel cell is a solid polymer fuel cell.

[10]

A sealing method for sealing at least part of at least two flanges of seal target components including the at least two flanges, at least one of the flanges allowing heat or active energy rays to pass therethrough, the method comprising the steps of:
  applying the curable resin composition according to any one of the [1] to [6] to a surface of at least one of the flanges;
  sticking the one flange with the curable resin composition applied thereto onto the other flange with the curable resin composition interposed in between; and
  sealing the at least part of the at least two flanges by curing the curable resin composition by heating or irradiation with the active energy rays through the flange that allows the active energy rays to pass therethrough.

A sealing method for sealing at least part of at least two flanges of seal target components including the at least two flanges, the method comprising the steps of:
  applying the curable resin composition according to any one of the [1] to [6] to at least one of the flanges;
  heating the applied curable resin composition or irradiating it with active energy rays to cure the curable resin composition, thereby forming a gasket composed of a cured product of the curable resin composition; and
  sealing the at least part of the at least two flanges by placing the other flange on the gasket and then pressure bonding the one flange with the curable resin composition applied thereto and the other flange together with the gasket interposed in between.

[12]

A sealing method for sealing at least part of at least two flanges of seal target components including the at least two flanges, the method comprising the steps of:
  placing a gasket formation mold on at least one of the flanges;
  injecting the curable resin composition according to any one of the [1] to [6] into at least part of a cavity formed between the gasket formation mold and the flange on which the mold is placed;
  heating the curable resin composition or irradiating it with the active energy rays to cure the curable resin composition, thereby forming a gasket composed of a cured product of the curable resin composition;
  detaching the mold from the one flange; and
  sealing the at least part of the at least two flanges by placing the other flange on the gasket and then pressure bonding the one and the other flanges together with the gasket interposed in between.

The present invention provides a curable resin composition which achieves both low-temperature curability and low compression set, and which further has excellent storage stability.

DESCRIPTION OF EMBODIMENTS

Figure 1:
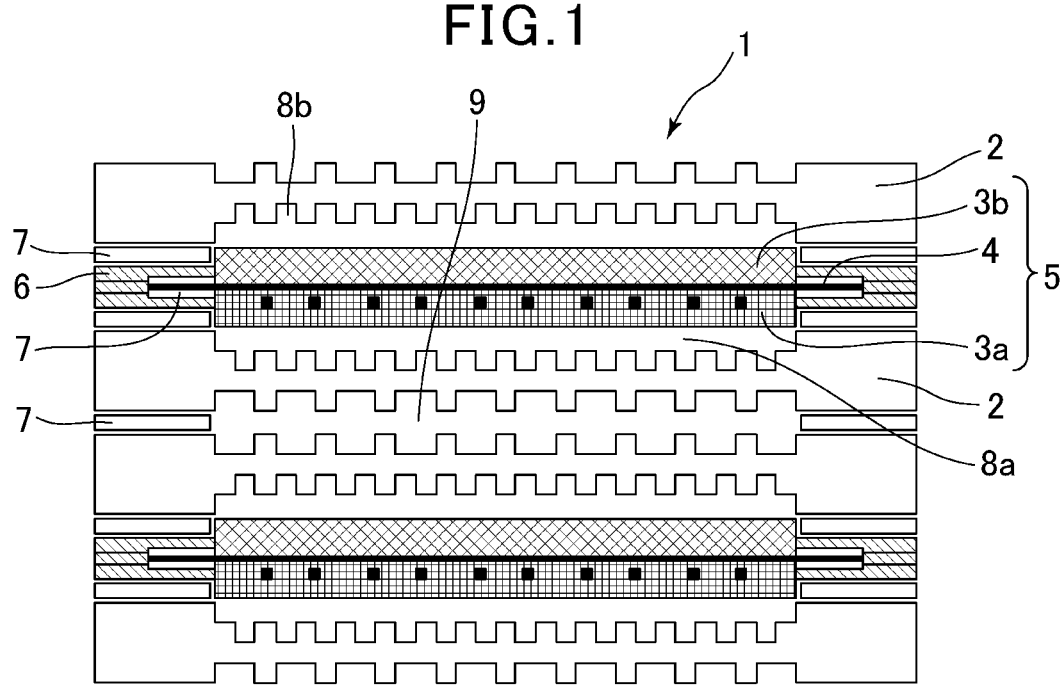
FIG. 1 is a schematic cross sectional view of a single cell of a fuel cell.

Hereinafter, the present invention will be described in details.

<(A) Ingredient>

An (A) ingredient used in the present invention is any vinyl polymer, not particularly limited, having one or more alkenyl groups per molecule and being liquid at 25° C. (normal temperature). The viscosity at 25° C. of the (A) ingredient of the present invention is not particularly limited, but is preferably 5 to 5000 Pa·s, more preferably 50 to 3000 Pa·s, and particularly preferably 100 to 2000 Pa·s from the viewpoint of workability and the like. Unless otherwise specified, the viscosity measurement used a cone-plate type viscometer and measured the viscosity at 25° C. Further, the vinyl polymer including an alkenyl group at a main chain terminal is preferable from viewpoints such as easiness to obtain a rubber elastic body having high strength and low compression set even while having low hardness. Here, it is suitable that the alkenyl group is, for example, an alkenyl group having 1 to 10 carbon atoms, preferably 2 to 8 carbon atoms, and more preferably 3 to 5 carbon atoms. Examples of preferred alkenyl groups include an allyl group, a propenyl group, and a butenyl group. The (A) ingredient preferably has 1 to 6 alkenyl groups, more preferably 2 to 4 alkenyl groups, still more preferably 2 to 3 alkenyl groups, and particularly preferably 2 alkenyl groups (particularly at both terminals of the polymer).

In addition, examples of the vinyl polymer of the component (A) include polyisobutylene, polyisoprene, polybutadiene, styrene, (meth)acrylic acid, (meth)acrylic acid ester, (meth)acrylamide, acrylonitrile, and polymers each produced by polymerization of mainly monomers selected from the group consisting of vinyl acetate, fluorine-containing vinyl monomers, and silicon-containing vinyl monomers. Among them, from the viewpoint of sealing properties, polyisobutylene, polyisoprene, and polybutadiene are preferable, and polyisobutylene is particularly preferable.

The polyisobutylene of the (A) ingredient only has to contain a —[$CH_2C(CH_3)_2$]— unit, and may be polyisobutylene which contains a "constituent unit other than the —[$CH_2C(CH_3)_2$]— unit." Then, a suitable content of —[$CH_2C(CH_3)_2$]— units in the (A) ingredient relative to the total mass of the constituent units in the (A) ingredient is, for example, 50% by mass or more, preferably 70% by mass or more, more preferably 75% by mass or more, and still more preferably 80% by mass or more. Meanwhile, the suitable content of —[$CH_2C(CH_3)_2$]— units in (A) ingredient is, for example, 100% by mass or less, 95% by mass or less in another mode, or 90% by mass or less in still another mode. In the present invention, it should be noted that poly or polymer is not theoretically restricted but is defined as, for example, a compound having a structure in which the main chain of the polymer contains repeating units of a monomer, the compound containing, for example, 100 or more repeating units, preferably 300 or more repeating units, and more preferably 500 or more repeating units.

Commercially available products of the polyisobutylene of the (A) ingredient are not particularly limited, but examples thereof include EPION 200A, 400A, and 600A (manufactured by Kaneka Corporation), and the like.

The molecular weight of the (A) ingredient of the present invention is not particularly limited. From the viewpoints of flowability, physical properties of cured products, and the like, the number average molecular weight is, for example, preferably 500 to 500,000, more preferably 1,000 to 100,000, and particularly preferably 3,000 to 50,000. Here, the number average molecular weight was calculated by a calculation method in terms of standard polystyrene using size-exclusion chromatography (SEC).

<(B) Ingredient>

The hydrosilyl group-containing compound of the (B) ingredient of the present invention is any hydrosilyl group-containing compound, not particularly limited, as long as the compound and the (A) ingredient can be cured by the hydrosilylation reaction. The hydrosilyl group means a group having a SiH bond. The (B) ingredient is not particularly limited, but preferably is organohydrogen polysiloxane or the like. More specifically, the (B) ingredient is a silicone composed of linear, branched, cyclic or network molecules each containing hydrosilyl groups. Moreover, a preferred compound contains, for example, 2 or more hydrosilyl groups, and preferably 3 or more hydrosilyl groups.

The amount of the (B) ingredient to be added is usually 0.5 to 2.0 equivalents, and preferably 1.0 to 1.8 equivalents with respect to 1 mol of the alkenyl group contained in the (A) ingredient. The amount of 0.5 equivalents or more is preferable, because the crosslinking density will not be too low, so that a cured product can have sufficient gas barrier property and low moisture permeability. Meanwhile, the amount of 2.0 equivalents or less is preferable, because the (B) ingredient will not cause a problem that a cured product is foamed due to hydrogen gas generated by the hydrosilylation reaction, nor affect the heat resistance.

<(C) Ingredient>

The hydrosilylation catalyst of the (C) ingredient of the present invention is not particularly limited as long as it can catalyze the hydrosilylation reaction, and any hydrosilylation catalyst can be used.

The preferable (C) ingredient for the case where the curable resin composition will be cured by heating is chloroplatinic acid, platinum, and solid platinum supported on a carrier such as alumina, silica, or carbon black; a complex of chloroplatinic acid with alcohol, aldehyde, ketone, or the like; a platinum-olefin complex such as Pt $(CH_2=CH_2)_2Cl_2$; a platinum-vinylsiloxane complex such as divinyltetramethyldisiloxane, $Pt_n(ViMe_2SiOSiMe_2Vi)_x$, or $Pt[(MeViSiO)_4]_y$; and a platinum-phosphite complex such as $Pt(PPh_3)_4$ or $Pt(PBu_3)_4$ (Vi represents a vinyl group, and Me represents a methyl group).

Among them, a chloroplatinic acid, a platinum-olefin complex, a platinum-vinylsiloxane complex, and the like are preferable from the viewpoint that the activity is excellent.

As the preferable (C) ingredient for the case where the curable resin composition will be cured by irradiation with active energy rays such as ultraviolet rays, it is possible to use a platinum catalyst having activity with the active energy rays, for example, a platinum complex having a β-diketonate compound as a ligand or a platinum complex having a cyclic diene compound as a ligand, or the like. Here, the active energy rays mean all types of rays in a broad sense, which include radioactive rays such as α ray and β ray, electromagnetic waves such as y ray and X ray, electron beam (EB), ultraviolet rays of about 100 to 400 nm, visible rays of about 400 to 800 nm, and the like, and the ultraviolet rays are preferable Examples of the above platinum complex having a β-diketonate compound as a ligand include
trimethyl(acetylacetonato)platinum,
trimethyl(3,5-heptanedionate)platinum,
trimethyl(methylacetoacetate)platinum,
bis(2,4-pentanedionato)platinum,
bis(2,4-hexanedionato)platinum,
bis(2,4-heptanedionato)platinum,
bis(3,5-heptanedionato)platinum,
bis(1-phenyl-1,3-(butanedionato)platinum,
bis(1,3-diphenyl-1,3-propanedionato)platinum, and the like. Among them, from the viewpoint of high activity with ultraviolet rays, bis(2,4-pentanedionato)platinum is preferable in particular.

Examples of the above platinum complex having a cyclic diene compound as a ligand include (1,5-cyclooctadienyl) dimethyl platinum complex, (1,5-cyclooctadienyl)diphenyl platinum complex, (1,5-cyclooctadienyl)dipropyl platinum complex, (2,5-norboradiene)dimethyl platinum complex, (2,5-norboradiene)diphenyl platinum complex, (cyclopentadienyl)dimethyl platinum complex, (methylcyclopentadienyl)diethyl platinum complex, (trimethylsilylcyclopentadienyl)diphenyl platinum complex, (methylcycloocta-1,5-dienyl)diethyl platinum complex, (cyclopentadienyl) trimethyl platinum complex, (cyclopentadienyl) ethyldimethyl platinum complex, (cyclopentadienyl) acetyldimethyl platinum complex, (methylcyclopentadienyl)trimethyl platinum complex, (methylcyclopentadienyl)trihexyl platinum complex, (trimethylsilylcyclopentadienyl)trimethyl platinum complex, (dimethylphenylsilylcyclopentadienyl)triphenyl platinum complex, (cyclopentadienyl)dimethyl trimethylsilylmethyl platinum complex, and the like.

Moreover, examples of the catalysts other than the platinum compounds include $RhCl(PPh_3)_3$, $RhCl_3$, $RuCl_3$, $IrCl_3$, $FeCl_3$, $AlCl_3$, $PdCl_2 \cdot 2H_2O$, $NiCl_2$, $TiCl_4$, and the like. These catalysts may be used alone or in combination of two or more.

The amount of the catalyst is not particularly limited, but it is preferable to use the catalyst compound in the range of $1\times10^{-1}$ to $1\times10^{-8}$ mol with respect to 1 mol of the alkenyl group in the (A) ingredient. The catalyst compound is preferably used in the range of preferably $1\times10^{-2}$ to $1\times10^{-6}$ mol. In addition, the amount of the hydrosilylation catalyst of less than $1\times10^{-1}$ mol is preferable because the obtained composition is not too expensive or does not cause a cured product to foam due to generation of hydrogen gas.

<(D) Ingredient>

The (D) ingredient of the present invention is a compound which inactivates a metal catalyst by chelating, and is generally called a heavy metal deactivator. A combination of the (D) ingredient with the other ingredients of the present invention has effects of enabling achievement in both low-temperature curability and compression set, and offering excellent storage stability. Examples of the (D) ingredient include amino group-containing triazine compounds, amino group-containing triazole compounds, hydrazide compounds, and the like. Among them, the amino group-containing triazine compounds and amino group-containing triazole compounds are preferable because of their particularly excellent effects.

Also, an amino group-containing compound such as the (D) ingredient is known to act as a catalyst poison for the (C) ingredient of the present invention. However, the (D) ingredient of the present invention is a specific one that does not act as a catalyst poison for some unknown reasons. Among the heavy metal deactivators used as the (D) ingredient, an ingredient that does not act as a catalyst poison for the (C) ingredient is preferable as a matter of course.

As the amino group-containing triazine compounds, there are 2,4,6-triamino-1,3,5-triazine and the like. As commercially available products thereof, there are ADK STAB ZS-27 (manufactured by ADEKA Corporation) and the like.

The amino group-containing triazole compound is not particularly limited, but examples thereof include acid amide derivatives of amino group-containing triazole compounds such as 3-amino-1,2,4-triazole, 3-amino-1,2,4-triazole-carboxylic acid, 3-amino-5-methyl-1,2,4-triazole, 3-amino-5-heptyl-1,2,4-triazole; 3-(N-salicyloyl)amino-1,2,4-triazole, 3-(N-salicyloyl)amino-5-methyl-1,2,4-triazole, and 3-(N-acetyl)amino-1,2,4-triazole-5-carboxylic acid. As commercially available products thereof, there are ADK STAB CDA-1 and CDA-1M (manufactured by ADEKA Corporation).

The hydrazide compound is not particularly limited, but examples thereof include N,N'-diformylhydrazine, N,N'-diacetylhydrazine, N,N'-dipropionylhydrazine, N,N'-butyrylhydrazine, N-formyl-N'-acetylhydrazine, N,N'-dibenzoylhydrazine, N,N'-ditoluoylhydrazine, N,N'-disalicyloylhydrazine, N-formyl-N'-salicyloylhydrazine, N-formyl-N'-butyl-substituted salicyloylhydrazine, N-acetyl-N'-salicyloylhydrazine, N,N'-bis[3-(3,5-di-t-butyl-4-hydroxyphenyl)propionyl] hydrazine, oxalic acid-di-(N'-salicyloyl) hydrazine, adipic acid-di-(N'-salicyloyl) hydrazine, and dodecanedioyl-di-(N'-salicyloyl) hydrazine. As commercially available products thereof, there are ADK STAB CDA-6 and CDA-10 (manufactured by ADEKA Corporation).

The content of the (D) ingredient is not particularly limited, but is 0.001 to 10 parts by mass, more preferably 0.01 to 7 parts by mass, and particularly preferably 0.1 to 5 parts by mass relative to 100 parts by mass of the (A) ingredient. The above range is preferable because the content of 0.001 parts by mass or more results in sufficiently-low compression set rate, whereas the content of 10 parts by mass or less has no risk of deterioration of the low-temperature curability.

<Optional Ingredients>

The composition of the present invention may use, as long as the object of the present invention is not impaired, additives such as crosslinking agents, reaction rate regulators, various elastomers such as styrene copolymers, bulking agents, storage stabilizers, antioxidants, light stabilizers, plasticizers, pigments, flame retardants, and surfactants.

A crosslinking agent maybe added in the present invention. Examples of the crosslinking agent include 2,4,6-tris(allyloxy)-1,3,5-triazine, 1,2-polybutadiene, 1,2-polybutadiene derivatives, trimethylolpropane diallylether, pentaerythritol triallylether, pentaerythritoltetra(meta)acrylate, trimethylolpropane tri(meta)acrylate, trimethylolpropane di(meta)acrylate, triallyl phosphate ester, triallylisocyanurate, diallylisocyanurate, diallylmonoglycidyl isocyanurate, diallylmonobenzylisocyanurate, diallylmonopropylisocyanurate, diallylphthalate, triallyltrimellitate, diethyleneglycol bis-allylcarbonate, trimethylolpropane diallylether, trimethylolpropane triallylether, pentaerythritol triallylether, pentaerythritoltetraallylether, 1,1,2,2-tetraallyloxyethane, diarylidene Pentaerythritol, triallylcyanurate, 1,2,4-trivinylcyclohexane, 1,4-butanediol diallylether, nonanediol diallylether, 1,4-cyclohexanedimethanol diallylether, triethyleneglycol diallylether, trimethylolpropane trivinylether, pentaerythritol tetravinylether, diallylether of bisphenol S, divinylbenzene, divinylbiphenyl, 1,3-diisopropenylbenzene, 1,4-diisopropenylbenzene, 1,3-bis(allyloxy) adamantane, 1,3-bis(vinyloxy)adamantane, 1,3,5-tris(allyloxy)adamantane, 1,3,5-tris(vinyloxy)adamantane, dicyclopentadiene, vinylcyclohexane, 1,5-hexadiene, 1,9-decadiene, diallylether, bisphenol A diallylether, 2,5-diallylphenolallylether; oligomers thereof; allylether of novolakphenol; and the like. Among them, 1,2,4-trivinylcyclohexane, triallylisocyanurate, 2,4,6-tris(allyloxy)-1,3,5-triazine, 1,2-polybutadiene, and the like are preferable because they have good compatibility with the (A) ingredient of the present invention.

A reaction rate regulator may be added in the present invention. Examples of the reaction rate regulator include a compound containing an aliphatic unsaturated bond, an organophosphorus compound, an organosulfur compound, a nitrogen-containing compound, and the like. These maybe used alone or in combination of two or more.

As the above compound containing an aliphatic unsaturated bond, specifically, there are propargyl alcohols such as 3-hydroxy-3-methyl-1-butyne, 3-hydroxy-3-phenyl-1-butyne, 3,5-dimethyl-1-hexyne-3-ol, and 1-ethynyl-1-cyclohexanol; enyne compounds; maleic anhydride; maleic acid esters such as dimethyl maleate and diethyl maleate; and the like. Specific examples of the organophosphorus compound include triorganophosphines, diorganophosphines, organophosphones, triorganophosphites, and the like. Specific examples of the organosulfur compound include organomercaptans, diorganosulfides, hydrogen sulfide, benzothiazole, thiazole, benzothiazole disulfide, and the like. Specific examples of the nitrogen-containing compound include N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, 2,2'-bipyridine, and the like.

Any of the various elastomers such as styrene copolymers may be added in the present invention. Examples of the various elastomers such as styrene copolymers include styrene-butadiene-styrene block copolymers, styrene-isoprene-styrene block copolymers, and hydrogenation products of them such as styrene-ethylene butylene-styrene block copolymers and styrene-ethylene propylene-styrene block copolymers. These may be used alone or in combination of two or more.

In the present invention, a bulking agent may be added for the purpose of improving the elastic modulus of a cured product, the flowability and the like, as long as the storage stability is not impaired. Specific bulking agents include organic powders, inorganic powders, metallic powders, and the like. Examples of the inorganic powder bulking agents include glass, fumed silica, alumina, mica, ceramics, silicone rubber powder, calcium carbonate, aluminum nitride, carbon powder, kaolin clay, dried clay mineral, dried diatomite, and the like. The content of the inorganic powder is preferably about 0.1 to 300 parts by mass relative to 100 parts by mass of the (A) ingredient. The content of less than 0.1 parts by mass results in too small effect, whereas the content of more than 300 parts by mass results in poor flowability of the curable resin composition and accordingly deterioration of the workability.

The fumed silica can be blended for the purpose of adjusting the viscosity of the curable resin composition or improving the mechanical strength of a cured product. A preferably usable fumed silica is one obtained by hydrophobic treatment with an organochlorosilane, a polyorganosiloxane, a hexamethyldisilazane, or the like. Specific examples of the fumed silica include commercially available products manufactured by NIPPON AEROSIL CO., LTD. under the trade names of AEROSIL R974, R972, R972V, R972CF, R805, R812, R812S, R816, R8200, RY200, RX200, RY200S, R202, and the like.

Examples of the organic powder bulking agents include polyethylene, polypropylene, nylon, crosslinked acryl, crosslinked polystyrene, polyester, polyvinyl alcohol, polyvinyl butyral, and polycarbonate. The content of the organic powder is preferably about 0.1 to 100 parts by mass relative to 100 parts by mass of the (A) ingredient. The content of 0.1 parts by mass or more is preferable because sufficient effects can be expected, whereas the content of 100 parts by mass or less is preferable because the curable resin composition can obtain sufficient flowability and is not deteriorated in the workability.

In the present invention, a storage stabilizer may be added. Examples of the storage stabilizer include 2-benzothiazolyl sulfide, benzothiazole, thiazole, dimethylacetylene dicarboxylate, diethylacetylene dicarboxylate, 2,6-di-t-butyl-4-methylphenol, butylhydroxyanisole, 2-(4-morphodinyldithio)benzothiazole, 3-methyl-1-butene-3-ol, acetylenically unsaturated group-containing organosiloxane, acetylenealcohol, 3-methyl-1-butyl-3-ol, diallyl fumarate, diallyl maleate, diethyl fumarate, diethyl maleate, dimethyl maleate, 2-pentenenitrile, 2,3-dichloropropene maley, and the like. These may be used alone or in combination of two or more.

In the present invention, an antioxidant may be added. Examples of the antioxidant include: quinone compounds such as β-naphthoquinone, 2-methoxy-1,4-naphthoquinone, methyl hydroquinone, hydroquinone, hydroquinone monomethyl ether, mono-tert-butyl hydroquinone, 2,5-ditert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butylcatechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 4,4'-butylidene-bis(6-tert-butyl-3-methylphenol), 4,4'-thio-bis(6-tert-butyl-3-methylphenol), 3,9-bis[2-[3-(3-tert-butyl-4-hydroxy-5-methylphenyl)propionyloxy]-1,1-dimethylethyl]-2,4,8,10-tetraoxaspiro[5,5]undecane, pentaerythritoltetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl) propionate, N,N'-hexane-1,6-diylbis[3-(3,5-di-tert-butyl-4-hydroxyphenyl)propionamide], benzene propanoic acid, 3,5-bis(1,1-dimethylethyl)-4-hydroxy, C7-C9 alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3",5,5',5"'-hexa-tert-butyl-a,a',a"-(mesitylene-2,4,6-tolyl)tri-p-cresol, calcium diethyl bis[[3,5-bis(1,1-dimethylethyl)-4-hydroxyphenyl]methyl]phosphonate, 4,6-bis(octylthiomethyl)-o-cresol, ethylene bis(oxyethylene) bis[3-(5-tert-butyl-4-hydroxy-m-tolyl)propionate], hexamethylene bis[3-(3,5-di-tert-butyl-4-hydroxyphenyl)propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl)methyl]-1,3,5-triazine-2,4,6(1H,3H,5H)-trione, a reaction product of N-phenylbenzenamine and 2,4,6-trimethylpentane, 2,6-di-tert-butyl-4-(4,6-bis(octylthio)-1,3,5-triazin-2-ylamino) phenol, picric acid, and citric acid; phosphorus compounds such as tris(2,4-di-tert-butylphenyl) phosphite, tris[2-[[2,4,8,10-tetra-tert-butyldibenzo[d,f][1,3,2]dioxaphosphepin-6-yl]oxy]ethyl]amine, bis(2,4-di-tert-butylphenyl) pentaerythritol diphosphite, bis[2,4-bis(1,1-dimethylethyl)-6-methylphenyl]ethyl ester phosphorous acid, tetrakis(2,4-di-tert-butylphenyl)[1,1-bisphenyl]-4,4'-diylbisphosphonite, and 6-[3-(3-tert-butyl-4-hydroxy-5-methylphenyl)propoxy]-2,4,8, 10-tetra-tert-butyldibenz[d,f][1,3,2]dioxaphosphepin; amine-based compounds such as phenothiazine; lactone-based compounds; vitamin E-based compounds; and the like. Among them, a phenol-based compound is preferable.

In the present invention, alight stabilizer may be added. Examples of the light stabilizer include: hindered amine-based compounds such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6, 6-tetramethylpiperidine, 1,2,2,6,6-pentamethyl-4-piperidinyl-methacrylate, bis(1,2,2,6,6-pentamethyl-4-piperidinyl)[[3,5-bis(1,1-dimethylethyl)-4-hydroxyphenyl] methyl]butyl malonate, decane diacid bis(2,2,6,6-tetramethyl-1(octyloxy)-4-piperidinyl)ester, a reaction product of 1,1-dimethylethyl hydroperoxide with octane, N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine, a polycondensate of dibutylamine·1,3, 5-triazine-N,N'-bis(2,2,6,6-tetramethyl-4-piperidyl-1,6-hexamethylenediamine with N-(2,2,6,6-tetramethyl-4-piperidyl)butylamine, poly[[6-(1,1,3,3-tetramethylbutyl) amino-1,3,5-triazine-2,4-diyl]][(2,2,6,6-tetramethyl-4-piperidyl)imino]hexamethylene[(2,2,6,6-tetramethyl-4-piperidyl)imino]], a polymer of dimethyl succinate with an ethanol of 4-hydroxy-2,2,6,6-tetramethyl-1-piperidine, 2,2, 4,4-tetramethyl-20-(β-lauryloxycarbonyl)ethyl-7-oxa-3,20-diazadispiro[5,1,11,2]heneicosan-21-one, β-alanine N-(2,2, 6,6-tetramethyl-4-piperidinyl)-dodecyl ester/tetradecyl ester, N-acetyl-3-dodecyl-1-(2,2,6,6-tetramethyl-4-piperidinyl)pyrroldine-2,5-dione, 2,2,4,4-tetramethyl-7-oxa-3,20-diazadispiro[5,1,11,2]heneicosan-21-one, 2,2,4,4-tetramethyl-21-oxa-3,20-diazabicyclo-[5,1,11,2]-heneicosan-20-propanoic acid-dodecyl ester/tetradecyl ester, propanedioic acid, [(4-methoxyphenyl)-methylene]-bis(1,2,2,6,6-pentamethyl-4-piperidinyl)ester, a higher fatty acid ester of 2,2,6, 6-tetramethyl-4-piperidinol, and 1,3-benzenedicarboxyamide,N,N'-bis(2,2,6,6-tetramethyl-4-piperidinyl); benzophenone-based compounds such as octabenzone; benzotriazole compounds such as 2-(2H-benzotriazole-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimide-methyl)-5-methylphenyl] benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl) propionate with polyethylene glycol, and 2-(2H-benzotriazole-2-yl)-6-dodecyl-4-methylphenol; benzoate-based compounds such as 2,4-di-tert-butylphenyl-3,5-di-tert-butyl-4-hydroxybenzoate; triazine-based compounds such as 2-(4, 6-diphenyl-1,3,5-triazine-2-yl)-5-[(hexyl)oxy]phenol; and the like. A hindered amine-based compound is particularly preferable.

In the present invention, a plasticizer, a pigment, a flame retardant and a surfactant maybe added. Examples of the plasticizer include petroleum-based process oils such as raffin-based process oil, naphthene-based process oil, and aromatic process oil; dibasic acid dialkyl such as diethyl phthalate, dioctyl phthalate, and dibutyl adipate; and low molecular weight liquid polymer such as liquid polybutene and liquid polyisoprene. Examples of the pigment include carbon and the like. Examples of the flame retardant include hydrated metal compound-based, phosphorus-based, silicone-based, nitrogen compound-based flame retardants and the like. Examples of the surfactant include anionic surfactant, nonionic surfactant, nonionic surfactant, and the like. These may be used alone or in combination of two or more.

The curable resin composition of the present invention can be produced by a publicly known conventional method. For example, the production can be carried out by preparing a mixture of predetermined amounts of the (A) to (D) ingredients and an additional optional ingredient(s), and mixing the mixture by using mixing means such as a mixer like a planetary mixer at a temperature of preferably 10 to 70° C., more preferably at 20 to 50° C., and particularly preferably at normal temperature (25° C.) for preferably 0.1 to 5 hours, more preferably 30 minutes to 3 hours, and particularly preferably about 60 minutes.

<Application Method>

As a method for applying the curable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating. Note that the curable resin composition of the present invention is preferably liquid at 25° C. from the viewpoint of easiness in application.

<Curing Method>

The curable resin composition of the present invention cured by heating or irradiation with active energy rays, thereby obtaining a cured product. The temperature and time period of the heating may be determined as conditions under which the resin composition can be sufficiently cured. It is appropriate to perform the heating under conditions at a temperature of, for example, 40 to 300° C., preferably 60 to 200° C., more preferably 80 to 150° C., and particularly preferably 100° C. for 10 seconds to 1 hour, preferably 20 seconds to 30 minutes, more preferably 30 seconds to 10 minutes, and still more preferably about 60 seconds. From the viewpoint of the low-temperature curability, the conditions at 80 to 150° C. for 20 seconds to 30 minutes are preferable.

A light source for the curing by irradiation with light of active energy rays, for example, ultraviolet rays, visible rays, or the like is not particularly limited, and examples thereof include a low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. As for an irradiation dose of light irradiation, a total dose is preferably 10 kJ/m$^2$ or more and more preferably 15 kJ/m$^2$ or more from the viewpoint of the properties of a cured product.

<Cured Product>

A cured product of the present invention can be obtained by curing the curable resin composition of the present invention in the foregoing curing method by heating or by irradiation with active energy rays such as ultraviolet rays. A cured product of the present invention may be any product obtained by curing the curable resin composition of the present invention regardless of a curing method employed.

<Usage and Sealing Agent>

Preferable usages of the curable resin composition of the present invention or the cured product thereof are curable sealing agents. In the present invention, the sealing agents are also used as adhesives, coating agents, casting agents, potting agents, and the like. The curable resin composition of the present invention is preferably liquid at 25° C. in order to use the curable resin composition for the above usages.

Since the curable resin composition of the present invention or the cured product thereof is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the curable resin composition of the present invention can be quickly cured by irradiation with active energy rays such as ultraviolet rays, and is excellent in the adhesion to an electrolyte membrane having properties difficult to bond.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as motive power sources for automobiles, power generators for households, small power sources for electronic equipment such as mobile phones, and power sources for emergency.

Figure 2:
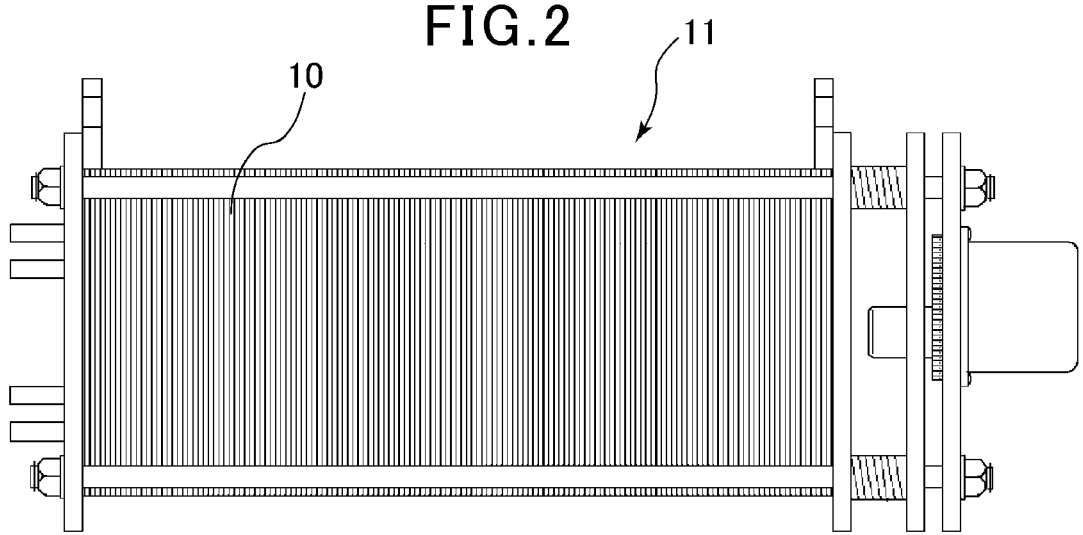
FIG. 2 is a schematic view illustrating an entire fuel cell.

As illustrated in FIG. 1, the cell 1 of the typical solid polymer fuel cell has the structure including: the electrolyte membrane electrode assembly 5 (MEA) structured such that the polymer electrolyte membrane 4 is nipped between the air electrode 3a and the fuel electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a cooling water flow path 9. Note that a package including several hundreds of such cells stacked one on another is referred to a cell stack 10 as illustrated in FIG. 2.

When the fuel gas (hydrogen gas) is supplied to the fuel electrode and the oxidation gas (oxygen gas) is supplied to the oxygen electrode (air electrode), the following reactions occur at the respective electrodes, and a reaction to generate water ($H_2+1/2O_2 \rightarrow H_2O$) occurs as a whole. To be more specific, protons ($H^+$) generated at the fuel electrode as presented below are diffused inside the solid polymer membrane to move to the oxygen electrode side, and water ($H_2O$) generated by reaction of the protons with the oxygen is discharged from the oxygen electrode side.

Fuel electrode (anode electrode): $H_2 \rightarrow 2H^+ + 2e^-$

Oxygen electrode (cathode electrode): $1/2O_2 + 2H^+ + 2^- \rightarrow H_2O$

In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas and the like. Specifically, the sealing agent is used between adjacent separators, between a separator and a frame, between a frame and an electrolyte membrane or MEA, and so on.

The polymer electrolyte membrane is a cation exchange membrane having ion conductivity, and is preferably made of a material such as a fluoropolymer having a sulfonic acid group because it is chemically stable and capable of operating reliably under high temperature. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the curable resin composition of the present invention makes it possible to bond the polymer electrolyte membrane.

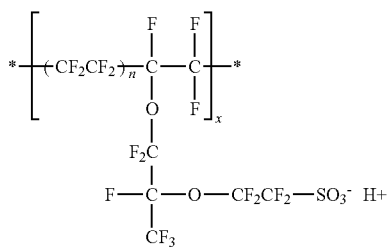

Nafion (registered trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte. As the gas diffusion layer, a known layer is used, and examples thereof include carbon paper, carbon cloth, carbon fiber, and the like.

As illustrated in FIG. 1, each of the separators 2 is provided with a finely-ribbed flow path, through which a fuel gas or an oxidation gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. Examples of a material for the frame include thermoplastic resins such as polyvinyl chloride, polyethylene naphthalate (PEN), polyethylene terephthalate (PET), polypropylene (PP), and polycarbonate. In addition, in order to bond members using the curable resin composition of the present invention or a cured product thereof, it is preferable that the members be light-transmissive.

The fuel cell of the present invention is a fuel cell characterized in that sealing is provided by the curable resin composition of the present invention or the cured product thereof. The members needed to be sealed in the fuel cell are the separators, the frame, the electrolyte, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path.

<Sealing Method>

A sealing method using the curable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is an adhesive sealing method involving: applying the curable resin composition of the present invention to a flange of a seal target component by an automatic coater or the like; and curing the curable resin composition, with the flange stuck on another flange, by heating or irradiation with active energy rays such as ultraviolet rays. More specifically, this is a sealing method for sealing at least part of at least two flanges of seal target components including the at least two flanges, at least one of which allows heat or active energy rays to pass therethrough, the method characterized by including the steps of: applying the foregoing curable resin composition to a surface of at least one of the flanges; sticking the one flange with the curable resin composition applied thereto onto the other flange with the curable resin composition interposed in between; and sealing the at least part of the at least two flanges by curing the curable resin composition by hearing or irradiation with the active energy rays through the flange which allows the active energy rays to pass therethrough.

CIPG is a method involving: applying the curable resin composition of the present invention in the form of a bead to a flange of a seal target component by an automatic coater or the like; forming a gasket by curing the curable resin composition by heating or irradiation with active energy rays; and performing compression sealing with the flange stuck on another flange. More specifically, this is a sealing method for sealing at least part of at least two flanges of seal target components including the at least two flanges, the method characterized by including the steps of: applying the foregoing curable resin composition to at least one of the flanges; heating the applied curable resin composition or irradiating it with active energy rays to cure the curable resin composition, thereby forming a gasket composed of a cured product of the curable resin composition; and sealing the at least part of the at least two flanges by placing the other flange on the gasket and then pressure bonding the one flange with the curable resin composition applied thereto and the other flange together with the gasket interposed in between.

MIPG is a method involving: placing a mold in pressure contact with a flange of a seal target component in advance; forming a gasket by injecting the curable resin composition into a cavity formed between the mold made of a light-transmissive material and the flange, and by heating or irradiation with the active energy rays; and performing compression sealing with the flange stuck on the other flange. In addition, for easy demolding of the gasket from the mold after the formation of the gasket, it is preferable to apply a release agent such as a fluorine-based or silicone-based agent to the mold in advance. More specifically, this is a sealing method for sealing at least part of at least two flanges of seal target components including the at least two flanges, the method characterized by including the steps of : placing a gasket formation mold on at least one of the flanges; injecting the foregoing curable resin composition into at least part of a cavity formed between the gasket formation mold and the flange on which the mold is placed; heating the curable resin composition or irradiating it with the active energy rays to cure the curable resin composition, thereby forming a gasket composed of a cured product of the curable resin composition; detaching the mold from the one flange; and sealing the at least part of the at least two flanges by placing the other flange on the gasket and then pressure bonding the one flange and the other flange together with the gasket interposed in between.

The liquid injection molding is a method involving: forming a gasket by injecting the curable resin composition of the present invention with a predetermined pressure into a mold, and by heating the curable resin composition or irradiating it with active energy rays; and performing compression sealing with the flange stuck on the other flange. In addition, for easy demolding of the gasket from the mold after the formation of the gasket, it is preferable to apply a release agent such as a fluorine-based or silicone-based agent to the mold in advance.

EXAMPLES

Hereinafter, the present invention will be described in more details by taking Examples, but the present invention should not be limited to these Examples.
<Preparation for Curable Resin Compositions>

Example 1

Example 1, that is, a curable resin composition was obtained by preparing a mixture by adding: the (A) ingredient of the present invention, that is, 100 parts by mass of polyisobutylene having allyl groups at both terminals and having 1700 Pa·s at 25° C. and a number average molecular weight of 10,300 (EPION 400A, manufactured by Kaneka Corporation); the (B) ingredient, 8 parts by mass of a compound having two or more hydrosilyl groups (CR-500, manufactured by Kaneka Corporation) (1.6 equivalents with respect to 1 mol of the alkenyl group of the (A) ingredient) ; the (C) ingredient, 300 μl of an isopropyl alcohol solution containing a platinum divinyltetramethyl-disiloxane complex (Pt-VTS-3.0IPA, manufactured by Umicore Precious Metals Japan Co., Ltd.) ($1 \times 10^{-3}$ mol with respect to 1 mol of the alkenyl group of the (A) ingredient); the (D) ingredient, 1 part by mass of 2,4,6-triamino-1,3,5-triazine (ZS-27, manufactured by ADEKA CORPORA-TION); 0.2 parts by mass of diethyl maleate (reagent) as a reaction rate regulator; and 30 parts by mass of spherical silica as a bulking agent, and by mixing the obtained mixture at normal temperature for 60 minutes with a planetary mixer.

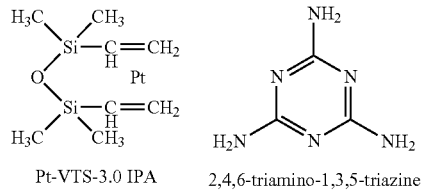

Pt-VTS-3.0 IPA    2,4,6-triamino-1,3,5-triazine

Example 2

Example 2 was obtained in the same preparation method as in Example 1 except that 1 part by mass of the 2,4,6-triamino-1,3,5-triazine in Example 1 was changed to 1.5 parts by mass.

Example 3

Example 3 was obtained in the same preparation method as in Example 1 except that 1 part by mass of the 2,4,6-triamino-1,3,5-triazine in Example 1 was changed to 2.0 parts by mass.

Example 4

Example 4 was obtained in the same preparation method as in Example 1 except that the 2,4,6-triamino-1,3,5-triazine in Example 1 was changed to 3-(N-salicyloyl)amino-1,2,4-triazole (amino group-containing triazine compound, CDA-1, manufactured by ADEKA CORPORATION).

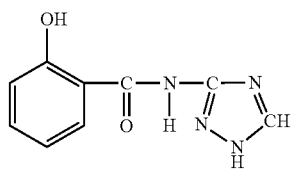

3-(N-salicyloyl)amino-1,2,4-triazole

Example 5

Example 5 was obtained in the same preparation method as in Example 1 except that N,N'-bis[3-(3,5-di-t-butyl-4-hydroxyphenyl)propionyl] hydrazine (CDA-10, manufactured by ADEKA CORPORATION) was used unlike Example 1.

Comparative Example 1

Comparative Example 1 was obtained in the same preparation method as in Example 1 except that the 2,4,6-triamino-1,3,5-triazine in Example 1 was excluded.

Comparative Example 2

Comparative Example 2 was obtained in the same preparation method as in Example 1 except that the 2,4,6- triamino-1,3,5-triazine in Example 1 was changed to tris-(trimethoxysilylpropyl) isocyanurate (KBM-9659, manufactured by Shin-Etsu Chemical Co., Ltd.).

Comparative Example 3

Comparative Example 3 was obtained in the same preparation method as in Example 1 except that the 2,4,6-triamino-1,3,5-triazine in Example 1 was changed to 3-aminopropyl triethoxysilane (KBM-903, manufactured by Shin-Etsu Chemical Co., Ltd.).

The test methods on Examples and Comparative Examples in Table 1 are as follows.

<Low-Temperature Curability Test>

First, 0.1 g of each of the curable resin compositions was dropped on a hot plate set at 100° C. and was contacted with a pointed rod at timings after 30 seconds and after 60 seconds to evaluate whether or not the composition was cured. The time at which the curing was observed is shown in Table 1. Incidentally, "uncured" in Table 1 means that the curing was not observed even after 60 seconds.

<Compression Set Test>

Each of the compositions in Examples and Comparative Examples was used and cured at 100° C. for 1 minute to obtain a cured product, and the cured product was after-baked at 100° C. for 10 minutes to obtain a test piece.

In accordance with JIS K 6262(2013), the test piece was placed under the conditions at 90° C. and a compression rate of 25%, and then the compression set of the test piece after 100 hours was measured. The results are shown in Table 1. As for the compression set in the present invention, less than 30% is preferable, and less than 25% is more preferable.

<Storage Stability>

Each of the curable resin compositions was placed in a plastic container having a capacity of 15 ml and allowed to stand for 1 day in an environment at a temperature of 25° C. Thereafter, the curable resin composition was contacted with a pointed rod and was evaluated based on the following evaluation criteria.

[Evaluation Criteria]

OK: The composition was observed being liquid without gelling.

NG: The composition was observed gelling.

Other modes of the present invention may be as follows.

[1]

A curable resin composition comprising (A) to (D) ingredients:

(A) ingredient: a vinyl polymer having one or more alkenyl groups per molecule and being liquid at 25° C.;

(B) ingredient: a compound having one or more hydrosilyl groups per molecule;

(C) ingredient: a hydrosilylation catalyst; and (D) ingredient: a heavy metal deactivator.

[2]

The curable resin composition according to the [1], wherein the (D) ingredient is one or more compounds selected from the group consisting of amino group-containing triazine compounds, aminotriazole compounds, and hydrazide compounds.

[3]

The curable resin composition according to the [1] or [2], wherein the vinyl polymer of the (A) ingredient is polyisobutylene having one or more alkenyl groups.

[4]

A sealing agent for fuel cell which uses the curable resin composition according to any one of the [1] to [3].

[5]

The curable resin composition according to any one of the [1] to [3], which is used as a sealing agent for any member in the group consisting of a separator, a frame, an electrolyte, a fuel electrode, an air electrode, and an MEA which are members constituting a fuel cell.

[6]

The curable resin composition according to any one of the [1] to [3], which is used as a sealing agent between adjacent separators in a fuel cell, or a sealing agent between a frame and an electrolyte membrane or an MEA in the fuel cell.

[7]

The curable resin composition according to anyone of the [4] to [6], wherein the fuel cell is a solid polymer fuel cell.

[8]

A fuel cell which uses the curable resin composition according to any one of the [1] to [3] for any of a seal between adjacent separators in the fuel cell and a seal between a frame and an electrolyte membrane or an MEA in the fuel cell.

TABLE 1

|  | Ex. 1 | Ex. 2 | Ex. 3 | Ex. 4 | Ex. 5 | Comp. Ex. 1 | Comp. Ex. 2 | Comp. Ex. 3 |
| --- | --- | --- | --- | --- | --- | --- | --- | --- |
| Low-Temperature Curability (Second) | 30 | 30 | 60 | 60 | 60 | 30 | 30 | Uncured |
| Compression Set (%) | 7% | 17% | 24% | 10% | 15% | 46% | 48% | — |
| Storage Stability | OK | OK | OK | OK | OK | NG | NG | OK |

From Examples 1 to 5 in Table 1, it can be found that the present invention achieves both low-temperature curability and low compression set, and further has excellent storage stability.

Meanwhile, Comparative Example 1 is a composition not containing the (D) ingredient of the present invention, and demonstrated poor results in the compression set and the storage stability. Then, Comparative Example 2 is a composition using tris-(trimethoxysilylpropyl) isocyanurate in place of the (D) ingredient of the present invention, and demonstrated a poor result with a compression set of 48%. Moreover, Comparative Example 3 is a composition using 3-aminopropyltriethoxysilane instead of the (D) ingredient of the present invention, and was not cured due to curing inhibition.

[9]

The fuel cell according to the [8], wherein the fuel cell is a solid polymer fuel cell.

[10]

A sealing method comprising:

applying the curable resin composition according to any one of the [1] to [3] to a flange of a seal target component; and sealing the flange and another flange stuck to each other by curing the curable resin composition by heating or irradiation with active energy rays.

[11]

A sealing method comprising:

forming a gasket by applying the curable resin composition according to any one of the [1] to [3] to a flange of a seal target component, and curing the curable resin composition by heating or irradiation with active energy rays; and thereafter sticking the flange to another flange and compression sealing the flanges.

[12] A sealing method comprising:

placing a mold in pressure contact with a flange of a seal target component in advance;

forming a gasket by injecting the curable resin composition according to anyone of the [1] to [3] into a cavity formed between the mold and the flange, and curing the curable resin composition by heating or irradiation with active energy rays; and thereafter sticking the flange to another flange and sealing the flanges.

INDUSTRIAL APPLICABILITY

The curable resin composition of the present invention is industrially useful because the curable resin composition achieves both low-temperature curability and low compression set, and further has excellent storage stability.

REFERENCE SIGNS LIST 1 cell in solid polymer fuel cell
2 separator
3a air electrode (cathode)
3b fuel electrode (anode)
4 polymer electrolyte membrane
5 electrolyte membrane electrode assembly (MEA)
6 frame
7 adhesive or sealing agent
8a oxidation gas flow path
8b fuel gas flow path
9 cooling water flow path
10 cell stack
11 solid polymer fuel cell

What is claimed is:

1. A curable resin composition comprising (A) to (D) ingredients:

(A) ingredient: a vinyl polymer having one or more alkenyl groups per molecule and being liquid at 25° C.;

(B) ingredient: a compound having one or more hydrosilyl groups per molecule;

(C) ingredient: a hydrosilylation catalyst; and (D) ingredient: a heavy metal deactivator being one or more compounds selected from the group consisting of 2,4,6-triamino-1,3,5-triazine, 3-amino-1,2,4-triazole, 3-amino-1,2,4-triazole-carboxylic acid, 3-amino-5-methyl-1,2,4-triazole, 3-amino-5-heptyl-1,2,4-triazole, 3-(N-salicyloyl)amino-1,2,4-triazole, 3-(N-salicyloyl) amino-5-methyl-1,2,4-triazole, 3-(N-acetyl)amino-1,2, 4-triazole-5-carboxylic acid, N,N'-diformylhydrazine, N,N'-diacetylhydrazine, N,N'-dipropionylhydrazine, N,N'-butyrylhydrazine, N-formyl-N'-acetylhydrazine, N,N'-dibenzoylhydrazine, N,N'-ditoluoylhydrazine, N,N'-disalicyloylhydrazine, N-formyl-N'-salicyloylhydrazine, N-formyl-N'-butyl-substituted salicyloylhydrazine, N-acetyl-N'-salicyloylhydrazine, N,N'-bis[3-(3,5-di-t-butyl-4-hydroxyphenyl)propionyl] hydrazine, oxalic acid-di-(N'-salicyloyl) hydrazine, adipic acid-di-(N'-salicyloyl) hydrazine, and dodecanedioyl-di-(N'-salicyloyl) hydrazine.

2. The curable resin composition according to claim 1, wherein the (D) ingredient is one or more compounds selected from the group consisting of 2,4,6-triamino-1,3,5-triazine, 3-amino-1,2,4-triazole, 3-amino-1,2,4-triazole-carboxylic acid, 3-amino-5-methyl-1,2,4-triazole, 3-amino-5-heptyl-1,2,4-triazole; 3-(N-salicyloyl)amino-1,2,4-triazole, 3-(N-salicyloyl)amino-5-methyl-1,2,4-triazole, and 3-(N-acetyl)amino-1,2,4-triazole-5-carboxylic acid.

3. The curable resin composition according to claim 1, wherein the vinyl polymer of the (A) ingredient is polyisobutylene having one or more alkenyl groups.

4. The curable resin composition according to claim 1, which is used as a sealing agent for any member in the group consisting of a separator, a frame, an electrolyte, a fuel electrode, an air electrode, and an MEA which are members constituting a fuel cell.

5. The curable resin composition according to claim 1, which is used as a sealing agent between adjacent separators in a fuel cell, or a sealing agent between a frame and an electrolyte membrane or an MEA in the fuel cell.

6. The curable resin composition according to claim 4, wherein the fuel cell is a solid polymer fuel cell.

7. A sealing agent for fuel cell which uses the curable resin composition according to claim 1.

8. A fuel cell comprising any seal from the group consisting of a seal between adjacent separators in the fuel cell and a seal between a frame and an electrolyte membrane or an MEA in the fuel cell, wherein the any seal comprises the curable resin composition according to claim 1.

9. The fuel cell according to claim 8, wherein the fuel cell is a solid polymer fuel cell.

10. A sealing method for sealing at least part of at least two flanges of seal target components including the at least two flanges, at least one of the flanges allowing heat or active energy rays to pass therethrough, the method comprising the steps of:

applying the curable resin composition according to claim 1 to a surface of at least one of the flanges;

sticking the one flange with the curable resin composition applied thereto onto the other flange with the curable resin composition interposed in between; and sealing the at least part of the at least two flanges by curing the curable resin composition by heating or irradiation with the active energy rays through the flange that allows the active energy rays to pass therethrough.

11. A sealing method for sealing at least part of at least two flanges of seal target components including the at least two flanges, the method comprising the steps of:

applying the curable resin composition according to claim 1 to at least one of the flanges;

heating the applied curable resin composition or irradiating it with active energy rays to cure the curable resin composition, thereby forming a gasket composed of a cured product of the curable resin composition; and sealing the at least part of the at least two flanges by placing the other flange on the gasket and then pressure bonding the one flange with the curable resin composition applied thereto and the other flange together with the gasket interposed in between.

12. A sealing method for sealing at least part of at least two flanges of seal target components including the at least two flanges, the method comprising the steps of:

placing a gasket formation mold on at least one of the flanges;

injecting the curable resin composition according to claim 1 into at least part of a cavity formed between the gasket formation mold and the flange on which the mold is placed;

heating the curable resin composition or irradiating it with the active energy rays to cure the curable resin composition, thereby forming a gasket composed of a cured product of the curable resin composition;

detaching the mold from the one flange; and sealing the at least part of the at least two flanges by placing the other flange on the gasket and then pressure bonding the one and the other flanges together with the gasket interposed in between.

13. A cured product obtained by curing the curable resin composition according to claim 1.

14. The curable resin composition according to claim 1, wherein the (A) ingredient is polyisobutylene, polyisoprene, or polybutadiene.

15. The curable resin composition according to claim 1, wherein the (B) ingredient is organohydrogen polysiloxane.

16. The curable resin composition according to claim 1, wherein the (C) ingredient is platinum divinyltetramethyldisiloxane complex.

17. The curable resin composition according to claim 1, wherein the (D) ingredient is 2,4,6-triamino-1,3,5-triazine.

18. The curable resin composition according to claim 1, wherein the content of the (D) ingredient is 0.001 to 10 parts by mass relative to 100 parts by mass of the (A) ingredient.

* * * * *